United States Patent [19]

Engstrom et al.

[11] Patent Number: 4,771,712

[45] Date of Patent: Sep. 20, 1988

[54] COMBUSTION OF FUEL CONTAINING ALKALINES

[75] Inventors: Folke Engstrom, San Diego, Calif.; Erkki Kiiskila, Karhula; Pekka Tormikoski, Neuvoton, both of Finland

[73] Assignee: A. Ahlstrom Corporation, Karhula, Finland

[21] Appl. No.: 65,757

[22] Filed: Jun. 24, 1987

[51] Int. Cl.$^4$ .............................................. F23D 1/00
[52] U.S. Cl. .................................... 110/347; 110/245; 110/263; 110/343; 122/4 D
[58] Field of Search ............... 110/245, 263, 342, 343, 110/344, 345, 347, 203, 204; 122/4 D; 431/7, 170; 432/15, 58; 34/57 A; 60/39, 464; 165/104.16

[56] References Cited

U.S. PATENT DOCUMENTS

| | | | |
|---|---|---|---|
| 3,625,164 | 12/1971 | Spechor | 122/4 D X |
| 3,807,090 | 4/1974 | Moss | 122/4 D X |
| 3,907,674 | 9/1975 | Roberts et al. | 110/245 X |
| 4,191,115 | 3/1980 | Yang et al. | 122/4 D X |
| 4,262,610 | 4/1981 | Hein et al. | 110/342 |
| 4,312,919 | 1/1982 | Devenney | 122/4 D X |
| 4,450,777 | 5/1984 | Wolhrum et al. | 110/342 |
| 4,579,070 | 4/1986 | Lin et al. | 122/4 D X |

OTHER PUBLICATIONS

A. Ahlstrom Corporation brochure "Pyroflow", Nov., 1984.
A. Ahlstrom Corporation brochure "Pyroflow A Multifuel Combustor", Mar., 1982.
Wall et al., "How to Burn Salty Sludges", *Chemical Engineering*, Apr. 14, 1975, pp. 77–82.

*Primary Examiner*—Steven E. Warner
*Attorney, Agent, or Firm*—Nixon & Vanderhye

[57] ABSTRACT

A method of burning solid fuel having low melting point alkaline compositions, such as alkali metal salts, particularly lignite and salty brown coal. The fuel is introduced into the reaction chamber of a circulating fluidized bed reactor, and is mixed prior to introduction to the reaction chamber with a reactant material capable of reacting with the low melting point alkaline compositions of the fuel to produce high melting point alkali metal compounds during combustion. The temperature in the reaction chamber is kept below the melting point of the formed alkali metal compounds. The reactant material comprises silica oxide or a metal oxide, or hydroxide, of the group consisting of aluminum, calcium, magnesium, iron, titanium, and mixtures of two or more thereof. Kaolin is particularly effective, especially when the molar ratio of Al/(Na and K) is at least 1.0.

22 Claims, No Drawings

COMBUSTION OF FUEL CONTAINING ALKALINES

BACKGROUND AND SUMMARY OF THE INVENTION

There are abundant fossil fuels which contain low melting point alkaline compositions (usually alkali metal salts), particularly lignite and salty brown coals. However only a small portion of such fossil fuels are utilized commercially because of the difficulties in producing energy from burning the lignite or the like. Typically, lignite is burned on a grate in a boiler furnace. However this requires high combustion temperatures, in the range of 1200°–1500° C., which causes sintering of the fuel. At these temperatures, the sulfates and chlorides evaporate, causing condensate on the walls of the furnace and other surfaces, and enhancing the formation of deposits on the boiler heat transfer tubes causing corrosion of the tubes and poor heat transfer. In order to deal with this problem, typically the furnaces must be frequently shut down and the deposits removed from the heat transfer tubes, something that is difficult to do.

While fluidized bed reactors are known to have many advantages over conventional boiler furnaces, in the past it has not been considered practical to burn many types of lignite and salty brown coal in fluidized bed reactors. This is because the alkalines in the lignite cause agglomeration of the bed material. The higher the alkali metal salt content of the fuel, the lower the agglomeration temperature is.

According to the present invention a method is provided which solves the long felt need of being able to effectively burn fuel containing alkaline compositions, such as lignite, and recover energy therefrom in a relatively simple and straight-forward manner. According to the present invention, this is accomplished utilizing a circulating fluidized bed reactor. Fluidized bed reactors are typically operated in the temperature range of about 750°–950° C. At the lower end of the temperature range the combustion of the fuel deteriorates, and at the upper end of the range the risk that the bed material will sinter increases.

According to the invention it is possible to burn solid fuel having low melting point alkaline compositions in a fluidized bed reactor by: using a circulating fluidized bed reactor, which has a relatively uniform temperature throughout the reaction chamber; and by the addition to the reaction chamber of a reactant material capable of reacting with the low melting point alkaline compositions of the fuel to produce high melting point alkali metal compounds during combustion. The alkali metal compounds produced during combustion have a high enough melting point so that the reactor may be operated at a desirable temperature (within the range of about 750°–950° C.) without melting. In this way agglomeration of the bed material, sintering of the fuel, and enhanced formation of deposits on operable components of the reactor are prevented.

The reactant material utilized according to the invention comprises an oxide, or a hydroxide which is converted to an oxide during combustion, of the group consisting of aluminum, calcium, magnesium, silica, iron, titanium, and mixtures of two or more of aluminum, calcium, magnesium, silica, iron, and titanium. If silica oxide is used, it desirably is used with a metal oxide. Typically sufficient metal oxide is added so that the ratio of metal of the metal oxide to metal of the alkali metal salts in the fuel is at least about 1.0. Preferably, the reactant material comprises kaolin (clay) which includes oxides of all of silica, aluminum, iron, titanium, calcium, and magnesium, and which reacts with the fuel and the circulating bed material to form high melting temperature sodium compounds. Typically the molar ratio of aluminum in the kaolin to sodium plus potassium in the fuel is at least 1.0.

It is desirable to also add limestone with the reactant material in order to absorb sulfur. Further, since the combustion of the fuel is for the purpose of producing useful heat energy (which may be transformed into steam energy, electricity, or the like), it is desirable to recover heat energy directly from the reaction chamber utilizing heat recovery apparatus disposed on the surface of, or in, the reactor chamber. Such heat recovery apparatus, which is conventional per se, has had minimal utility in the past when lignite was the fuel due to the build up deposits on the heat recovery surfaces. However in view of the fact that the formation of deposits on the heat recovery tubes is minimized according to the invention, such apparatus can be effectively utilized in the reaction chamber itself.

After start-up, a circulating fluidized bed operated according to the invention has little sand or other bed-forming constituents in the fluidized bed. While some sand, or other accessory bed material is added during start-up, once a steady state condition is achieved the circulating bed material comprises mainly the lignite fuel, kaolin, and ash; still agglomeration of the bed material does not occur. The reactor is operated, including by withdrawing and recovering heat directly from the reaction chamber, so that the temperature in all parts of the reaction chamber is between about 750°–950° C., and specifically is lower than the melting temperature of the alkali metal compounds formed by the reaction of the kaolin (or the like) with the alkali metal salts in the fuel, during combustion.

It is the primary object of the present invention to provide a simple yet effective method for burning fuel containing low melting point alkaline compositions, to produce and recover heat energy. This and other objects of the invention will become clear from an inspection of the detailed description of the invention, and from the appended claims.

BRIEF DESCRIPTION OF THE DRAWING

The drawing FIGURE is a schematic illustration of an exemplary circulating fluidized bed reactor with which the method according to the invention may be carried out.

DETAILED DESCRIPTION OF THE DRAWING

The circulating fluidized bed reactor illustrated in the drawing is a basically typical circulating reactor, having heretofore been used for the successful combustion of a diversity of fuels to recover heat from the fuels, including coal, oil, wastes, and the like. While such reactors have been utilized to burn lignite and salty brown coals, or like fuels containing low melting point alkaline compositions such as alkali metal salts, the results of combustion of such fuels have been much less satisfactory than for other fuels. In particular problems of agglomeration of the bed material, sintering of the fuel, and enhanced formation of deposits on the heat recovery tubes, have been experienced, and made such fuels impractical.

The reactor in the drawing includes a hopper 1 in which a solid alkaline-containing fuel, such as lignite or salty brown coal having a high sodium content, is provided. The fuel is fed from the hopper 1 at a controlled rate by a feed screw 2 to a mixing chamber 3. A reactant material according to the invention, which reacts with the low melting point alkaline compositions of the fuel to produce high melting point alkali metal compounds, is supplied from hopper 4 at a controlled rate by the feed screw 5 to the mixing chamber 3. Limestone may also be added to the mixing chamber 3, as indicated schematically by reference numeral 5' in the drawing, to absorb sulfur in the reaction chamber.

The reactant material preferably is added in the form of particulate solids, and is desirably at least one metal oxide (or a hydroxide which is converted to an oxide during combustion) of the group aluminum, calcium, magnesium, iron, or titanium, or silica oxide. Preferably the reactant material is a mixture of several of such metal oxides and/or silica oxide, one particularly preferred material being kaolin (clay), which includes significant proportions of silica oxide and aluminum oxide, and also contains some calcium oxide, magnesium oxide, iron oxide, and titanium oxide.

Also added to the mixing chamber 3 are solid particulates separated in the cyclone separator 6 of the conventional circulating fluidized bed reactor 7. Combustion of the fuel takes place in the reaction chamber 7' of the reactor 7, and exhaust gases are produced, which exit the reaction chamber 7' through the exhaust duct 8.

The mixture of solid particulate fuel, reactant material, limestone, and particles passes through duct 9 to the lower end of the reaction chamber 7'. A blower 10, or a like device, is utilized to generate a flow of air so that primary and secondary air is added through the conduits 11, 12, respectively, to the reaction chamber 7'. At least one of the sources of gas 11, 12, includes oxygen containing gas to react with the fuel. The gas fluidizes the bed of solid material, and a large volume of material continuously circulates from the reaction chamber 7', through cyclone separator 6, and back to conduit 9. In this way unreacted reactant material (e.g. kaolin) is recovered so that the amount of reactant material utilized is minimized.

During start up of the reactor 7, sand, or a similar inert bed material, is introduced into the reaction chamber 7. However once a steady state condition is established (i.e. after start up), no further bed material is introduced, but rather the circulating bed during the steady state condition comprises mainly the solid fuel particles, kaolin, and ash.

Exhaust gases, after passing the cyclone separator 6, pass to the flue gas filter 13, in which ash is separated from the gas. The ash may be disposed of, and/or at least a portion of the ash may be recirculated, through conduit 14, to the mixing chamber 3. The blower 10 supplies air for transporting the ash to the mixing chamber 3.

Since the purpose of combustion of the lignite or brown coal is to recover heat energy (which ultimately may take the form of steam or electricity), it is desirable to provide heat transfer surfaces 15 which are disposed in the wall 16 of the reaction chamber 7', or within the reaction chamber 7'. Preferably heat is also recovered from the flue gases utilizing conventional convective boiler 17 disposed between the cyclone separator 6 and the filter 13.

In the circulating bed reactor 7, a large flow of circulating material is maintained, which results in a substantially uniform temperature throughout the reaction chamber 7', which is useful in ensuring that the reactor 7 is operated in such a way that the maximum temperature therein is lower than the melting point of the alkali metal compounds produced by reaction of the reactant and the fuel alkaline compositions, during combustion. Typically, the reactor would be operated at a temperature of between about 750°–950° C., with an optimum temperature of about 865° C. Fuel which has not burned and which is contained in the flue gases, as well as unreacted reactant material such as kaolin, are efficiently recovered by the cyclone separator 6, and recirculated through mixing chamber 3 and chute 9.

The feed screws 2 and 3 are controlled depending upon the amount of recycled fuel and reactant material, and also to control the temperature in the reaction chamber 7'. Further, the proportions of reactant material in fuel are controlled so that the ratio of metal of the metal oxide to metal of the alkali metal salts (e.g. Na and K), is at least about 1.0. Also the amount of oxygen containing gas added to the reaction chamber 7', and the throughput of heat recovery fluid through the heat recovery apparatus 15, as well as other parameters, may be controlled to maintain the temperature in the reaction chamber 7' at a desired level.

EXAMPLE

Tests have been carried out on combustion of salty brown coal in the presence of kaolin in a pilot plant circulating fluidized bed reactor as illustrated in the drawing. Representative samples of the fuel and the reactant material were analyzed. The following analyses were obtained:

| | | | Coal Analysis Dry Solids | | | | | |
|---|---|---|---|---|---|---|---|---|
| Ash content (d.s.) % | in d.s. % | C in d.s. % | S in d.s. % | Na in d.s. % | K in d.s. % | Cl in d.s. % | Ca in d.s. % | Mg in d.s. % |
| 3.2 | 15.8 | 61.9 | 3.7 | 2.60 | 0.07 | 2.71 | 1.62 | 0.20 |

| Kaolin Analysis | |
|---|---|
| $SiO_2$ | 48.7% |
| $Al_2O_3$ | 36.0% |
| $Fe_2O_3$ | 0.8% |
| $TiO_2$ | 0.05% |
| CaO | 0.06% |
| MgO | 0.25% |
| $K_2O$ | 2.12% |
| $Na_2O$ | 0.10% |

Sand was introduced into the reactor as a starting material but during operation the circulating bed consisted mainly of brown coal, kaolin and ash. The mass flow rates of the fuel and the additive and the ratio of Al/(Na and K) were varied. The temperature in the reactor 7 was maintained at about 865° C., and was substantially uniform throughout the chamber 7'. The reactor chamber was cooled by heat transfer tubes 15 disposed in the reactor chamber.

No agglomeration of the bed material and no sintering on the heat recovery surfaces occurred when the Al/(Na and K) molar ratio was 1.0 or higher.

It will thus be seen that according to the present invention it is possible to effectively burn fuel having low melting point alkaline compositions, to produce and recover heat energy, in a fluidized bed reactor without agglomeration of the bed material, sintering of the fuel, or enhanced formation of deposits on operable components (particularly heat transfer surfaces) of the reactor. While the invention has been herein shown and described in what is presently conceived to be the most practical and preferred embodiment thereof, it will be apparent to those in the art that many modifications may be made thereof within the scope of the invention, which scope is to be accorded the broadest interpretation of the appended claims so as to encompass all equivalent methods and procedures.

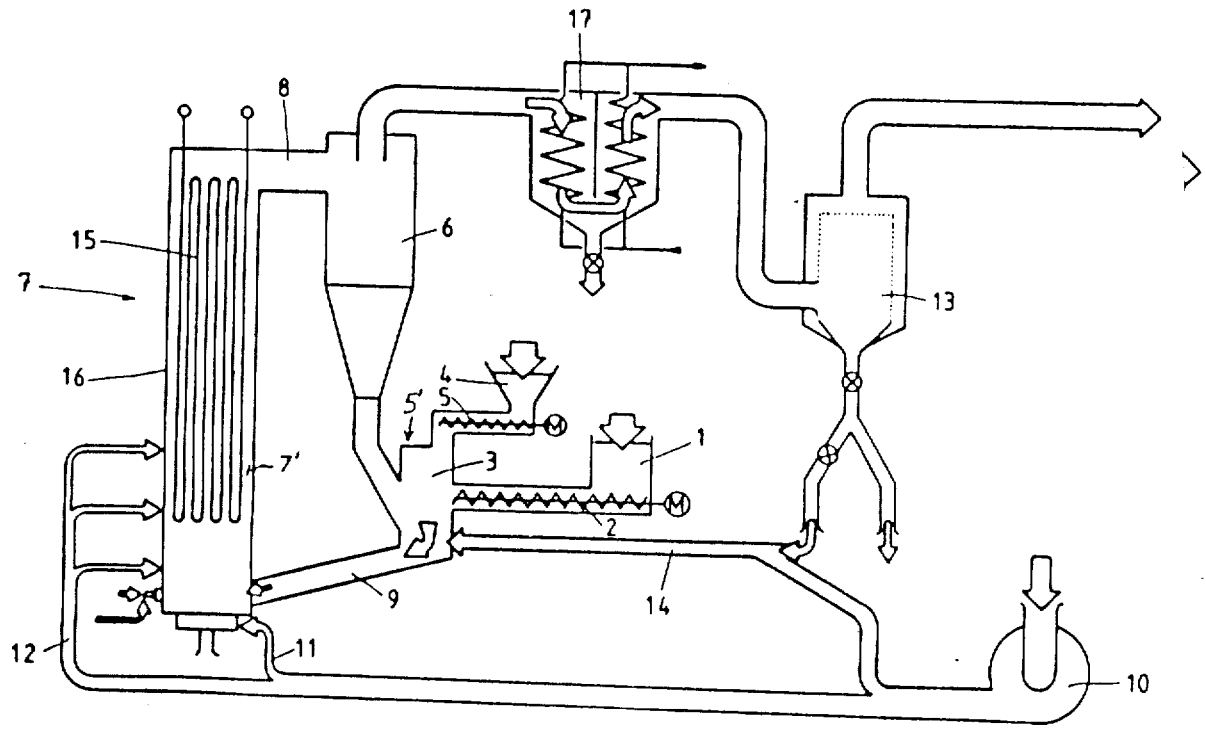

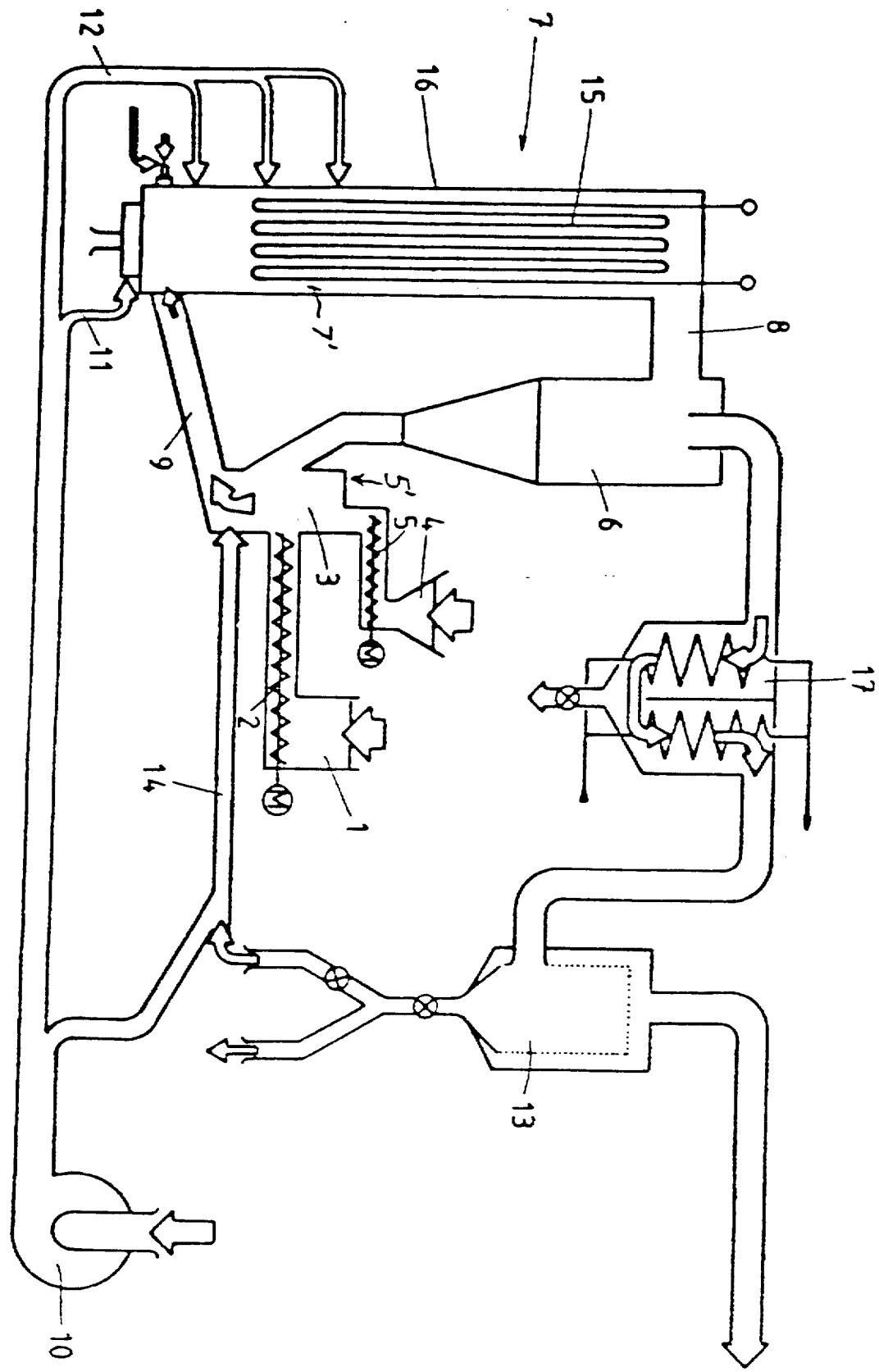

What is claimed is:

1. A method of burning solid fuel having low melting point alkaline compositions, to produce and recover heat energy, utilizing a circulating fluidized bed reactor having a reaction chamber, comprising the steps of:
   (a) introducing solid fuel having low melting point alkaline compositions, and gas containing oxygen, into the reaction chamber, so that combustion occurs in a fluidized bed, and hot exhaust gases containing solid particles are discharged from the reaction chamber;
   (b) recirculating solid particles, separated from the exhaust gases discharged from the reaction chamber, back into the reaction chamber;
   (c) introducing into the reaction chamber, with the fuel, a reactant material capable of reacting with the low melting point alkaline compositions of the fuel to produce high melting point alkali metal compounds during combustion of the fuel; and
   (d) controlling addition of oxygen and fuel into the reaction chamber, and/or other parameters affecting combustion temperature, so that the temperature in all portions of the reaction chamber is lower than the melting point of the alkali metal compounds produced during reaction of the reactant material with alkaline compositions of the fuel.

2. A method as recited in claim 1 wherein the fuel is selected from the group consisting of lignite and salty brown coal, and the fuel is mixed together with the reactant material and solid particulates before it is added to the reaction chamber.

3. A method as recited in claim 1 wherein step (d) is practiced by recovering heat energy directly from the reaction chamber utilizing heat recovery apparatus disposed on the surface of or in the reactor chamber, and the fuel is mixed together with the reactant material and solid particulates before it is added to the reaction chamber.

4. A method as recited in claim 1 wherein the reactant material is an oxide, or a hydroxide which is converted to an oxide during combustion, of the group consisting of aluminum, calcium, magnesium, silica, iron, titanium, and mixtures of two or more of aluminum, calcium, magnesium, silica, iron, and titanium; and wherein step (c) is practiced by introducing the reactant material in solid particulate form into the reaction chamber.

5. A method as recited in claim 4 wherein the reactant material is a metal oxide, or hydroxide which is converted to an oxide during combustion, and wherein the alkaline compositions in the fuel contain alkali metal salts; and wherein step (c) is practiced so that the ratio of metal of the metal oxide to metal of the alkali metal salts is at least about 1.0.

6. A method as recited in claim 5 wherein the reactant material is kaolin which is added in solid particulate form, and wherein the alkali metal salts include sodium and potassium salts, and wherein step (c) is practiced so that the ratio of Al/(Na and K) is at least 1.0.

7. A method as recited in claim 4 wherein the reactant material is kaolin.

8. A method as recited in claim 7 wherein the alkaline compositions contained in the fuel include sodium and potassium compositions; and wherein sufficient kaolin is added so that the molar ratio of Al/(Na and K) is at least 1.0, and unreacted kaolin particles are separated and recirculated in the practice of step (b).

9. A method as recited in claim 7 wherein step (d) is practiced by recovering heat energy directly from the reaction chamber utilizing heat recovery apparatus disposed on the surface of or in the reactor chamber.

10. A method as recited in claim 9 wherein the fuel is selected from the group consisting of lignite and salty brown coal.

11. A method as recited in claim 9 comprising the further step of adding limestone to the reaction chamber with the reactant material, to adsorb sulphur.

12. A method of operating a circulating fluidized bed reactor after startup, the reactor having a reaction chamber, comprising the steps of, after startup:
   (a) feeding fuel, selected from the group consisting essentially of lignite and salty brown coal, into the reaction chamber, along with gas including oxygen, to provide a fluidized bed in the reaction chamber in which combustion takes place to produce exhaust gases;
   (b) feeding kaolin into the reaction chamber;
   (c) withdrawing solid particles and ash from the exhaust gases from the reaction chamber, and recirculating them to the reaction chamber; and
   (d) withdrawing and utilizing heat energy from the reactor;
   steps (a)-(d) being practiced so that the circulating bed material comprises mainly fuel, kaolin, and ash, with little sand or other bed-forming constituents, and agglomeration of the bed material and sintering of the fuel do not occur.

13. A method as recited in claim 12 wherein the fuel contains sodium and potassium salts, and wherein step (b) is practiced so that sufficient kaolin is added so that the molar ratio of Al/(Na and K) is at least about 1.0.

14. A method as recited in claim 13 comprising the further steps of withdrawing and recovering heat directly from the reaction chamber using heat recovery surfaces disposed on the surfaces of, or within the reaction chamber, and controlling the temperature of combustion so that the temperature in all parts of the reaction chamber is between about 750°–950° C.

15. A method of combusting fuel containing low melting point alkaline compositions, utilizing a circulating fluidized bed reactor having a reaction chamber, comprising the steps of:
   (a) establishing a fluidized bed within the reaction chamber, including gas containing oxygen, fuel containing low melting point alkaline compositions, and solids, to combust the fuel and produce exhaust gases leaving the reaction chamber;
   (b) separating solids in the off gases from the off gases, and recirculating them to the reaction chamber to form part of the fluidized bed;
   (c) adding a reactant material to the reaction chamber which reacts with the low melting point alkaline compositions of the fuel to produce alkali metal compounds having a melting temperature of above about 950° C.; and (d) maintaining the combustion within the reaction chamber, including by withdrawing and recovering heat directly therefrom, so that the maximum temperature in the reaction chamber is below about 950° C. so that agglomeration of the bed material, sintering of the fuel, and enhanced formation of deposits on operable components of the fluidized bed reactor are avoided.

16. A method as recited in claim 15 comprising the further step of adding limestone to the reaction chamber at the same time as the reactant material, to adsorb sulphur, and wherein the fuel and reactant material are mixed together prior to adding them to the reaction chamber.

17. A method as recited in claim 15 wherein the reactant material is an oxide, or a hydroxide which is converted to an oxide during combustion, of the group consisting of aluminum, calcium, magnesium, silica, iron, titanium, and mixtures of two or more of aluminum, calcium, magnesium, silica, iron, and titanium; and wherein step (c) is practiced by introducing the reactant material in solid particulate form into the reaction chamber.

18. A method as recited in claim 15 wherein the reactant material is kaolin which is added in solid particulate form, and wherein the alkali metal salts include sodium and potassium salts, and wherein step (c) is practiced so that the ratio of Al/(Na and K) is at least 1.0.

19. A method of burning a fuel selected from the group consisting of lignite and salty brown coal utilizing a fluidized bed reactor having a reaction chamber, comprising the steps of:
(a) establishing and maintaining a fluidized bed including fuel, oxygen containing gas, and solid bed particles, to effect combustion of the fuel and produce exhaust gases which exit the reaction chamber;
(b) maintaining the temperature substantially uniform throughout the reaction chamber, and in the range of about 750°–950° C.; and
(c) preventing agglomeration of the bed material, sintering of the fuel, and enhanced formation of deposits on operable components of the fluidized bed reactor, by adding to the reaction chamber sufficient solid particulate metal oxide, or hydroxide which is converted to oxide during combustion, selected from the group consisting of aluminum, calcium, magnesium, silica, iron, titanium, and mixtures of two or more of aluminum, calcium, magnesium, silica, iron, and titanium, so that the metal oxides react with constituents of the lignite or salty brown coal to prevent agglomeration, sintering, or enhanced formation of deposits on operable components of the reactor.

20. A method as recited in claim 19 wherein the metal oxide includes aluminum, and the fuel includes sodium and potassium salts, and wherein step (c) is practiced so that the molar ratio of Al/(Na and K) is at least about 1.0.

21. A method as recited in claim 19 comprising the further step of withdrawing and utilizing heat directly from the reaction chamber.

22. A method as recited in claim 21 wherein the metal oxide includes aluminum, and the fuel includes sodium and potassium salts, and wherein step (c) is practiced so that the molar ratio of Al/(Na and K) is at least about 1.0, and the fuel and metal oxide are mixed together prior to addition to the reaction chamber.

* * * * *

UNITED STATES PATENT AND TRADEMARK OFFICE
CERTIFICATE OF CORRECTION

PATENT NO. : 4,771,712

DATED : September 20, 1988

INVENTOR(S) : Folke Engstrom et al.

It is certified that error appears in the above-identified patent and that said Letters Patent is hereby corrected as shown below:

The Title Page should be deleted to appear as per attached title page.

The sheet of drawing should be add as shown on the attached sheet

On the Title Page, "22 Claims, No Drawings" should read
-- 22 Claims, 1 Drawing Sheet --.

Signed and Sealed this

Fourth Day of July, 1989

Attest:

DONALD J. QUIGG

Attesting Officer

Commissioner of Patents and Trademarks

United States Patent [19]

Engstrom et al.

[11] Patent Number: 4,771,712
[45] Date of Patent: Sep. 20, 1988

[54] COMBUSTION OF FUEL CONTAINING ALKALINES

[75] Inventors: Folke Engstrom, San Diego, Calif.; Erkki Kiiskila, Karhula; Pekka Tormikoski, Neuvoton, both of Finland

[73] Assignee: A. Ahlstrom Corporation, Karhula, Finland

[21] Appl. No.: 65,757

[22] Filed: Jun. 24, 1987

[51] Int. Cl.⁴ .................................. F23D 1/00
[52] U.S. Cl. ............................. 110/347; 110/245; 110/263; 110/343; 122/4 D
[58] Field of Search ............... 110/245, 263, 342, 343, 110/344, 345, 347, 203, 204; 122/4 D; 431/7, 170; 432/15, 58; 34/57 A; 60/39, 464; 165/104.16

[56] References Cited

U.S. PATENT DOCUMENTS

| | | | |
|---|---|---|---|
| 3,625,164 | 12/1971 | Spechor | 122/4 D X |
| 3,807,090 | 4/1974 | Moss | 122/4 D X |
| 3,907,674 | 9/1975 | Roberts et al. | 110/245 X |
| 4,191,115 | 3/1980 | Yang et al. | 122/4 D X |
| 4,262,610 | 4/1981 | Hein et al. | 110/342 |
| 4,312,919 | 1/1982 | Devenney | 122/4 D X |
| 4,450,777 | 5/1984 | Wolhrum et al. | 110/342 |
| 4,579,070 | 4/1986 | Lin et al. | 122/4 D X |

OTHER PUBLICATIONS

A. Ahlstrom Corporation brochure "Pyroflow", Nov., 1984.
A. Ahlstrom Corporation brochure "Pyroflow A Multifuel Combustor", Mar., 1982.
Wall et al., "How to Burn Salty Sludges", *Chemical Engineering*, Apr. 14, 1975, pp. 77-82.

*Primary Examiner*—Steven E. Warner
*Attorney, Agent, or Firm*—Nixon & Vanderhye

[57] ABSTRACT

A method of burning solid fuel having low melting point alkaline compositions, such as alkali metal salts, particularly lignite and salty brown coal. The fuel is introduced into the reaction chamber of a circulating fluidized bed reactor, and is mixed prior to introduction to the reaction chamber with a reactant material capable of reacting with the low melting point alkaline compositions of the fuel to produce high melting point alkali metal compounds during combustion. The temperature in the reaction chamber is kept below the melting point of the formed alkali metal compounds. The reactant material comprises silica oxide or a metal oxide, or hydroxide, of the group consisting of aluminum, calcium, magnesium, iron, titanium, and mixtures of two or more thereof. Kaolin is particularly effective, especially when the molar ratio of Al/(Na and K) is at least 1.0.

22 Claims, No Drawings